(12) United States Patent
Capps

(10) Patent No.: US 8,094,234 B2
(45) Date of Patent: Jan. 10, 2012

(54) SYSTEM AND METHOD FOR MULTISTAGE FRAME RATE CONVERSION

(75) Inventor: Marshall Charles Capps, Farmers Branch, TX (US)

(73) Assignee: Texas Instruments Incorporated, Dallas, TX (US)

( * ) Notice: Subject to any disclaimer, the term of this patent is extended or adjusted under 35 U.S.C. 154(b) by 560 days.

(21) Appl. No.: 12/251,271

(22) Filed: Oct. 14, 2008

(65) Prior Publication Data

US 2010/0091181 A1 Apr. 15, 2010

(51) Int. Cl.
*H04N 7/01* (2006.01)
*H04N 5/445* (2006.01)
*H04N 9/74* (2006.01)

(52) U.S. Cl. .................. 348/441; 348/564; 348/598

(58) Field of Classification Search .................. 348/441, 348/458, 459, 563–567, 584, 588, 598; 345/629, 345/634; *H04N 7/01, 11/20, 5/445, 9/74, H04N 9/76, 5/45*
See application file for complete search history.

(56) References Cited

U.S. PATENT DOCUMENTS

2008/0151108 A1* 6/2008 Doswald ................... 348/456
2009/0208123 A1* 8/2009 Doswald ................... 382/236

\* cited by examiner

*Primary Examiner* — Sherrie Hsia
(74) *Attorney, Agent, or Firm* — Charles A. Brill; Wade J. Brady, III; Frederick J. Telecky, Jr.

(57) ABSTRACT

System and method for multistage frame rate conversion. A method comprises receiving an incoming frame at a first frame rate, and determining whether a fault condition exists. The method also includes if the fault condition does not exist, toggling a write buffer pointer from a first frame buffer to a second frame buffer, and storing the incoming frame in the second frame buffer. The method additionally includes if the fault condition exists, determining whether a previously received frame was repeated, discarding the incoming frame if the previously received incoming frame was not repeated, and storing the incoming frame in one of the frame buffers pointed to by the write buffer pointer if the previously received incoming frame was repeated.

20 Claims, 10 Drawing Sheets

SYSTEM AND METHOD FOR MULTISTAGE FRAME RATE CONVERSION

TECHNICAL FIELD

The present invention relates generally to a system and method for displaying images, and more particularly to a system and method for multistage frame rate conversion.

BACKGROUND

In general, the term judder means to vibrate with intensity. In the field of displaying images, the term judder generally means a visual artifact arising from dropped fields or frames and having the appearance of jerky or stuttering camera movement. Judder may be introduced when images are sampled at a first frame rate and then converted to a second frame rate for viewing purposes. Additional frame rate conversions may further increase the presence of judder.

Typically, multiple frame rate conversions are not required when displaying most images. Usually, a single frame rate conversion may be sufficient. An image sequence at a first frame rate being frame rate converted to a second frame rate, which is the frame rate of an image display device.

One type of image display where multiple frame rate conversions may commonly appear is image overlay. Image overlays are images formed when at least two image sequences with potentially different frame rates combined into a single image sequence and then displayed on an image display device. FIG. 1a displays an image overlay 100. Image overlay 100 comprises an image from a first image source 105 overlaying an image from a second image source 110. Image overlay 100 may commonly be referred to as a picture in a picture (PIP). Other forms of image overlay may be split screen, picture out of picture (POP), and so forth, generated with images from two, three, four or more image sources.

If the two (or more) image sequences have different frame rates, then a first image sequence (an overlay image sequence) may need to be frame rate converted to a frame rate of a second sequence (a primary image sequence) prior to the overlaying of images from the first image sequence onto images from the second sequence. Then, if a display device being used to display the images from the overlaid sequence uses a frame rate different from the frame rate of the second sequence, the overlaid sequence may also need to be frame rate converted prior to being displayed.

FIG. 1b displays a portion of a prior art video processor 150 used to overlay images from multiple image sequences. As shown in FIG. 1b, video processor 150 may overlay images from video input one onto images from video input two. Video processor 150 includes a video input one that provides a first sequence of images at a frame rate Frequency A (FREQ A) and a video input two that provides a second sequence of images at a frame rate Frequency B (FREQ B), where FREQ A is not equal to FREQ B.

Since the frame rates of the sequences of images do not match, the overlay images may not be created by simply combining the images from the first sequence and the images from the second sequence. The frame rate of one of the sequences may need to be converted so that the two frame rates match. Video processor 150 includes a first frame rate converter 155 coupled to the video input one. First frame rate converter 155 may perform a frame rate conversion on the first image sequence so that the frame rate of the first image sequence is substantially equal to the frame rate of the second image sequence.

The frame rate conversion performed by first frame rate converter 155 may require the repeating of some of the images in the first image sequence if the FREQ A is less than the FREQ B or the dropping of some of the images of the first image sequence if the FREQ A is greater than the FREQ B. In general, the dropping of images may cause the judder since image information is typically lost when images are dropped. This is especially true when there is motion present in the images being dropped. The repeating of images may not produce as many visual artifacts as the dropping of images since image information is generally not lost while duplicating images.

After matching the frame rate of the first sequence to the frame rate of the second sequence, an overlay control unit 160 may be used to create an overlay image sequence. The overlay image sequence will have a frame rate equal to the second sequence and if the frame rate of the display device is different from the frame rate of the overlay image sequence, then an additional frame rate conversion may be needed. A second frame rate converter 165 may be used to convert the frame rate of the overlay image sequence (at FREQ B) to the frame rate of the display device, FREQ C. The output of second frame rate converter 165 may then be provided to the display device, where the output will be displayed.

The frame rate conversion performed by second frame rate converter 165 may exacerbate any judder created in the frame rate conversion performed by first frame rate converter 155. The judder may be further exaggerated if the frame rate conversion performed by the second frame rate converter 165 results in the dropping of overlay images containing non-repeated images from the first image sequence while those containing repeated images are kept, since the dropping of the non-repeated images may further amplify the loss of motion information.

Additionally, the type of images in the image sequences used to create overlay images may have an impact on the visual artifacts. With sequences of interlaced images, wherein each interlaced image comprises an odd image field and an even image field, the dropping of image fields may result in more readily noticeable visual artifacts if more image fields of one type are being dropped. For example, if a number of consecutive even image fields (or odd image fields) are being dropped, the visual artifacts may be more noticeable.

SUMMARY OF THE INVENTION

These and other problems are generally solved or circumvented, and technical advantages are generally achieved, by embodiments of a system and a method for multistage frame rate conversion.

In accordance with an embodiment, a method for performing a frame rate conversion from a first frame rate to a second frame rate is provided. The method includes receiving an incoming frame at the first frame rate, and determining whether a fault condition exists. The method also includes if the fault condition does not exist, toggling a write buffer pointer from a first frame buffer to a second frame buffer, and storing the incoming frame in the second frame buffer. The method additionally includes if the fault condition exists, determining whether a previously received frame was repeated, discarding the incoming frame if the previously received incoming frame was not repeated, and storing the incoming frame in one of the frame buffers pointed to by the write buffer pointer if the previously received incoming frame was repeated.

In accordance with another embodiment, a method for displaying overlay images from a first image sequence having a first frame rate and a second image sequence having a second frame rate on a display system having a display frame rate is provided. The method includes generating an overlay image sequence from the first image sequence and the second image sequence, frame rate converting the overlay image sequence to the display frame rate, and displaying the frame rate converted overlay image sequence at the display frame rate. The frame rate converting includes determining whether an overlay image frame will be stored based on a frame repeat control signal indicating when there is a repeated frame in the overlay image sequence.

In accordance with another embodiment, a display system is provided. The display system includes a display configured to produce images based on image data, a first image input receiving a first image sequence at a first frame rate, a second image input receiving a second image sequence at a second frame rate, a video processor coupled to the first image input and to the second image input, and a controller coupled to the video processor and to the display. The video processor performs a sequence of frame rate conversions on the first image sequence and the second image sequence, wherein each frame rate conversion after an initial frame rate conversion uses a frame repeat control signal generated during a previous frame rate conversion to determine if an image frame will be stored, and the controller controls the operation of the display based on the image data.

An advantage of an embodiment is that judder arising from multistage frame rate conversion is reduced.

A further advantage of an embodiment is that very little additional hardware and software is needed. This may help to minimize impact on the cost of implementation. The minimal additional hardware and software requirements may also help to reduce any impact on display system reliability.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a digital micromirror device (DMD) based microdisplay image display system capable of creating and displaying image overlays, wherein image sequences used in the image overlays may have different frame rates. Furthermore, the discussion focuses on the displaying of an interlaced video image sequence with each interlaced video image comprising an odd image field and an even image field. The invention may also be applied, however, to other image display systems using other forms of microdisplays, including deformable micromirrors, liquid crystal on silicon (LCOS), ferroelectric liquid-crystal-on-silicon, reflective, transmissive, and transflective liquid crystal displays (LCD), and so forth. Additionally, the invention may be applied to other types of video display systems, including direct view display systems, such as those using plasma, LCD, cathode ray tube (CRT), and so on, displays. Also, the invention may be applied to image sequences of non-interlaced images. In general, the invention may be applied to applications wherein there is a desire to create and display overlay images, whether the images are interlaced, non-interlaced, or a combination thereof. Furthermore, the invention may be applied in situations wherein multiple frame rate conversions are utilized with a desire to reduce or minimize image judder. For example, the invention may be utilized when an image sequence is created using a film camera, then converted into a television compatible image sequence, and finally is displayed on an image display device using a frame rate different from that of the television.

The invention may also be utilized when a computer is used to up convert an image sequence to a user specified frame rate, then the up converted image sequence is displayed on a display device with a different frame rate, which would require another frame rate conversion.

Figure 1A:
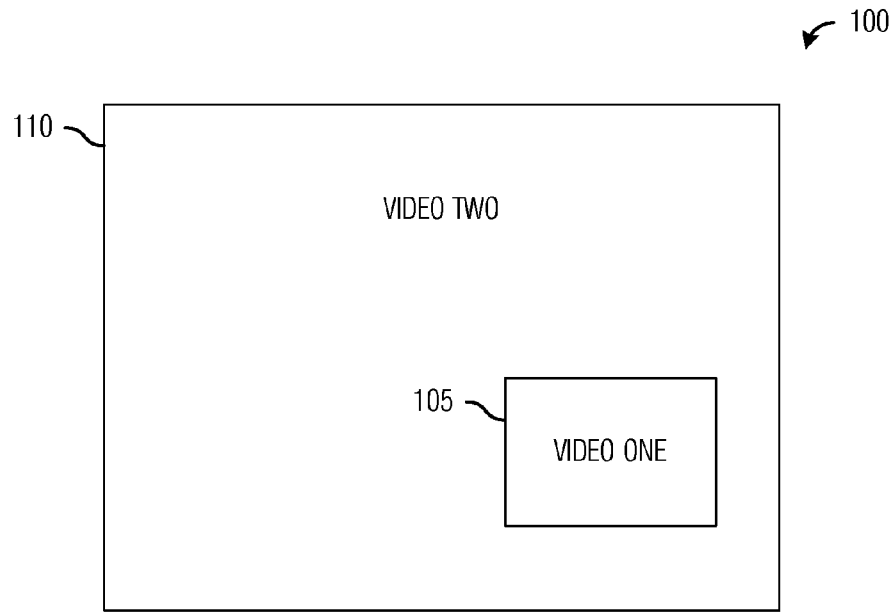
FIG. 1a is a diagram illustrating an overlay image.
Figure 1B:
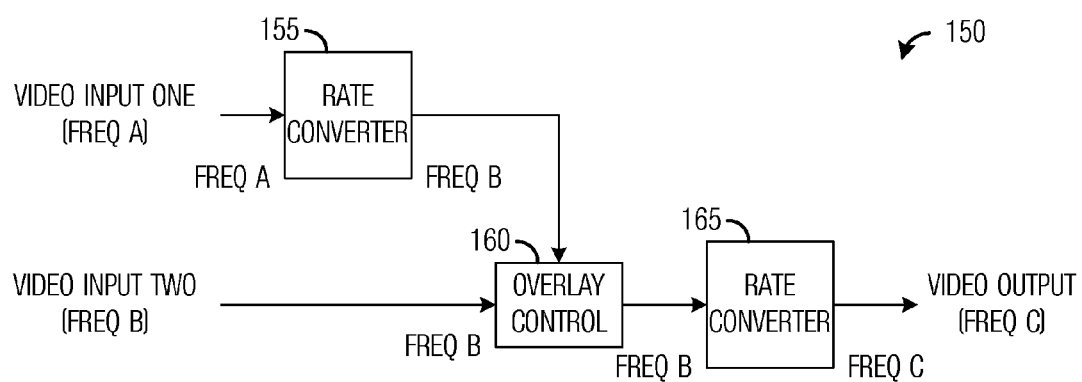
FIG. 1b is a block diagram illustrating a portion of a video processor.
Figure 2:
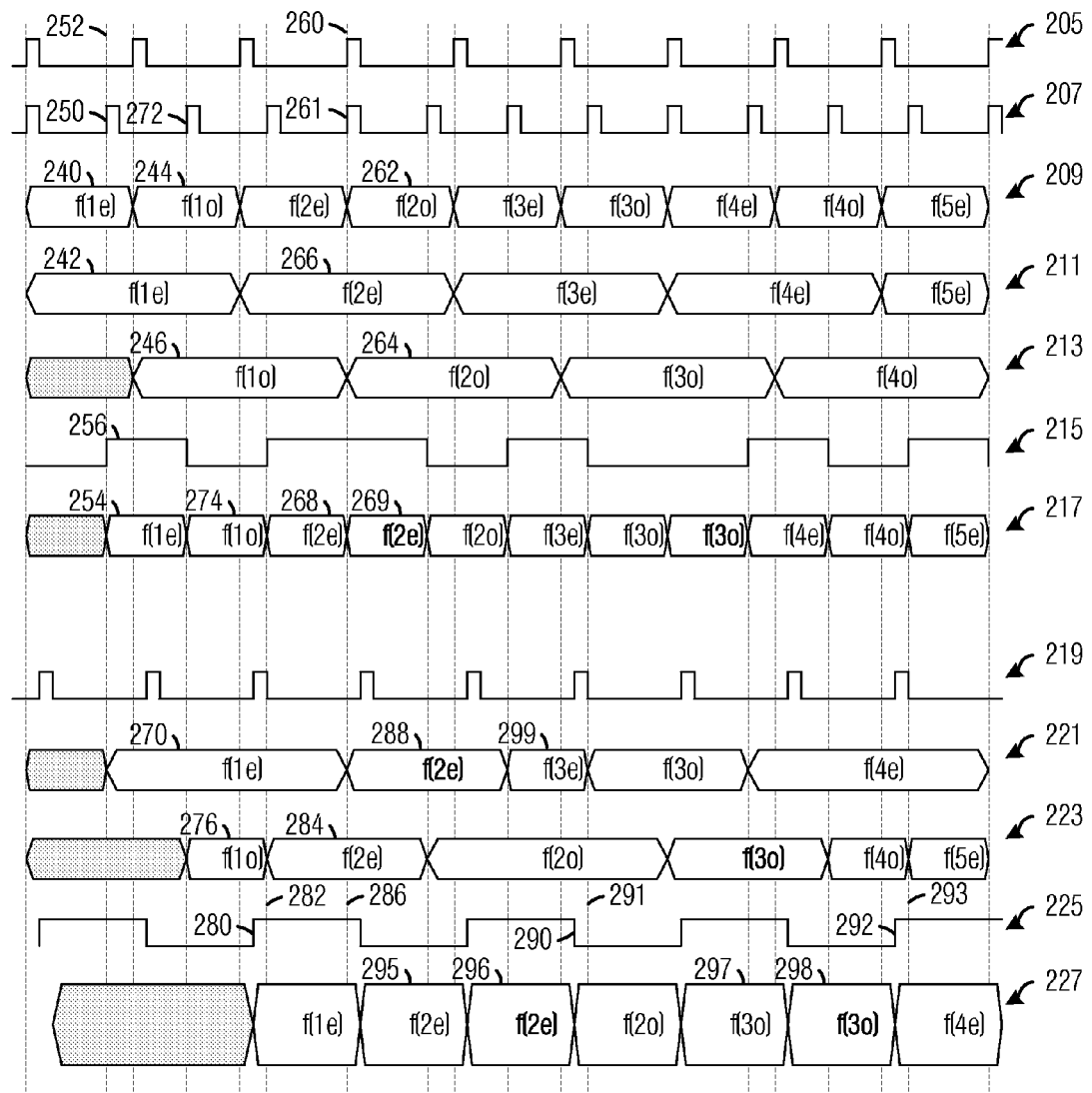
FIG. 2 is a timing diagram illustrating multiple waveforms in an image display system, wherein the image display system uses a prior art technique for reducing image judder.

With reference now to FIG. 2, there is shown a timing diagram illustrating multiple waveforms in an image display system, wherein the image display system uses a prior art technique for reducing image judder. As shown in FIG. 2, a first waveform 205 represents a first sync signal of a first image sequence with a first frame rate (a first frequency), such as 60 Hz, and a second waveform 207 represents a second sync signal of a second image sequence with a second frame rate (a second frequency), such as 85 Hz.

Also shown are a third waveform 209 representing a sequence of interlaced image fields of the first image sequence, a fourth waveform 211 representing contents of a first video buffer, and a fifth waveform 213 representing contents of a second video buffer. Furthermore, a sixth waveform 215 representing an output buffer select signal used to select between the first video buffer and the second video buffer and a seventh waveform 217 representing an output of a first frame rate converter are shown. The first frame rate converter may be used to change the frame rate of the first image sequence to match that of the second image sequence.

FIG. 2 also displays an eighth waveform 219 representing a third sync signal. The third sync signal may be a sync signal for the image display system. The third sync signal may be used to time a third image sequence at a third frame rate (a third frequency), such as 60 Hz. Furthermore, a ninth waveform 221 representing contents of a third video buffer, a tenth waveform 223 representing contents of a fourth video buffer, an eleventh waveform 225 representing a second output buffer select signal (for the image display system) used to select between the third video buffer and the fourth video buffer, and a twelfth waveform 227 representing an output of a second frame rate converter are shown. To maintain simplicity, images from the second image sequence are not displayed in FIG. 2.

As shown in the first waveform 205 and the third waveform 209, interlaced image fields of the first image may be in sync with pulses of the first sync signal. As shown in FIG. 2, the interlaced image fields may be in sync with a rising edge of pulses of the first sync signal, although in alternate embodiments the interlaced image fields may be in sync with a falling edge of pulses of the first sync signal, when the first sync signal exceeds a threshold, when the first sync signal falls below a threshold, a level value, and so forth. As the interlaced image fields of the first image sequence (at the first frequency) arrive at the image display system, they fill the first video buffer and the second video buffer in an alternating fashion. For example, as shown in FIG. 2, an image field "f(1e)" 240 of the first image sequence is stored in the first video buffer (shown as fourth waveform 211) as stored image field "f(1e)" 242, while an image field "f(1o)" 244 is stored in the second video buffer (fifth waveform 213) as stored image field "f(1o) 246. Although shown as being filled almost instantaneously, it may take a finite amount of time for an image field to fill up a video buffer.

In order to meet the second frame rate of the second image sequence (e.g., 85 Hz), the first frame rate of the first image sequence (e.g., 60 Hz) should be increased. The first frame rate converter may be used to perform the frame rate conversion. At each rising edge (or falling edge) of a pulse of the second sync signal, i.e., the sync signal of the second image sequence (shown as waveform 207), the first frame rate converter may produce as output an image field from a stored image field from either the first video buffer or the second video buffer.

The output of the first frame rate converter (a frame rate converted first image sequence) may be produced by selecting either the first video buffer or the second video buffer and outputting an image field stored in the first video buffer or the second video buffer. By producing an image field timed by the second sync signal, the first frame rate converter is producing a sequence of image fields at the second frame rate. In other words, the first frame rate converter is converting the first image sequence from the first frequency (e.g., 60 Hz) to the second frequency (e.g., 85 Hz). Although the discussion focuses on a first frequency of 60 Hz and a second frequency of 85 Hz, the embodiments may be operable with any of a variety of frequencies. Therefore, the discussion of 60 Hz and 85 Hz should not be construed as being limiting to either the scope or the spirit of the embodiments.

For example, at a rising edge of a pulse 250 the second sync signal (with a time corresponding to the rising edge shown as dotted line 252), the first frame rate converter selects stored image field "f(1e)" 242 being stored in the first video buffer to output. Waveform 217 shows the stored image field as output image field "f(1e)" 254. The output of the first frame rate converter (waveform 217) begins to change after the dotted line 252. The first frame rate converter may select to output a stored image field from either the first video buffer or the second video buffer by asserting a specified value on the output buffer select signal (shown as waveform 215). As shown in FIG. 2, if the value of the output buffer select signal is high, then the stored image field from the first video buffer is selected and if the value is low, then the stored image field from the second video buffer is selected. Since the first frame rate converter is selected to output the stored image field from the first video buffer, the value of the output buffer select signal is high (level 256 of waveform 215).

Since it takes a finite amount of time for an image field to begin to fill a video buffer (either the first video buffer or the second video buffer), if a sufficient portion of an image field is not already present in the video buffer, it may not be possible for the first frame rate converter to select that particular video buffer. For example, pulse 260 of the first sync signal and pulse 261 of the second sync signal occur at substantially the same time. As a result of pulse 260, image field "f(2o)" 262 may begin to fill the second video buffer (shown as stored image field "f(2o)" 264). However, at pulse 261, the first frame rate converter must select either the contents of the first video buffer or the second video buffer to output.

Since the first frame rate converter has previously selected the stored image field from the first output buffer (stored image field "f(2e)" 266), ideally and to preserve the integrity of the first image sequence, the first frame rate converter should now select the stored image field from the second video buffer. If the image field "f(2o)" 262 has just started to fill the second video buffer, then a sufficient portion of the image field may not be available to output. Therefore, the first frame rate converter selects to output the stored image field from the first video buffer (stored image field "f(2e)" 266). Since the first frame rate converter has previously selected to output stored image field "f(2e)" 266 (shown as output image field "f(2e)" 268), the stored image field "f(2e)" 266 is repeated (shown as output repeated image field "f(2e)" 269).

The output of the first frame rate converter, the frame rate converted first image sequence, may then be combined with the second image sequence to produce an overlay image sequence. However, for purposes of displaying the overlay image sequence, if the frame rate of the overlay image sequence (e.g., 85 Hz) does not match a third frame rate of the image display device (e.g., 60 Hz), then the frame rate of the overlay image sequence should be decreased. The frame rate conversion may be performed by a second frame rate converter. The frame rate conversion performed by the second frame rate converter, which converts the overlay image sequence at the second frame rate down to the third frame rate (i.e., the frame rate of the image display device), may be timed by a third sync signal (shown as waveform 219).

As with the first frame rate conversion, a pair of video buffers (the third video buffer and the fourth video buffer) may be used to store image fields from the overlay image sequence as it is being outputted by overlay control unit 160. Contents of the third video buffer and the fourth video buffer are shown as waveforms 221 and 223, respectively. Since the overlay image sequence is at the second frame rate, the second sync signal (or another signal with substantially the same frequency) may be used to switch between the third video buffer and the fourth video buffer for the purpose of storing the image fields from the overlay image sequence. For example, at pulse 250, the output of the overlay control unit (which contains output image field "f(1e)" 254 in addition to an image field from the second image sequence) may be stored in the third video buffer (shown as stored output image field "f(1e)" 270 in waveform 221).

Although waveform 217 represents the output of the first frame rate converter, the output of the overlay control unit contains the output of the first frame rate converter and does not change the arrangement or order of the output of the first frame rate converter. Therefore, waveform 217 may also be used to represent the output of the overlay control unit. At pulse 272, the output of the overlay control unit, which is now output image field "f(1o)" 274, may be stored in the fourth video buffer (shown as stored output image field "f(1o)" 276). In general, the output of the overlay control unit may be stored in an alternating fashion in the third video buffer and the fourth video buffer. For example, if a first image field is stored in the third video buffer, then a second image field will be stored in the fourth video buffer, then a third image field is stored in the third video buffer, and so forth.

The third sync signal (waveform 219) may be used to control the output of the second frame rate converter. A commonly used technique for controlling the output of the second frame rate converter may be to toggle an output control signal, such as the second output buffer select signal (waveform 225), based on the third sync signal. As shown in FIG. 2, the state of the second output buffer select signal changes with rising edges of pulses of the third sync signal. Although shown as changing on rising edges of the third sync signal, the state of the second output buffer select signal may change on other triggers, such as falling edges, levels, and so forth, of the third sync signal. The state of the second output buffer select signal (e.g., high or low) may be used specify the contents of which video buffer (either the third video buffer or the fourth video buffer) is provided at the output of the second frame rate converter. As shown in FIG. 2, the third video buffer is outputted if the state is high, while the fourth video buffer is outputted if the state is low.

As stated above, the output of the overlay control unit may be stored in an alternating fashion in the third video buffer and the fourth video buffer. However, this may not be possible due to differences in the second frame rate and the third frame rate, the time needed to write an image field into a video buffer, the time needed to read an image field out of a video buffer, and so on. For example, if a rising edge of the third sync signal (used to control selection of the second output buffer select signal for reading out of an image field from a video buffer) arrives shortly after a rising edge of the second sync signal (used to control selection of a video buffer for writing an image field to a video buffer), then a fault condition may arise wherein it may be possible for the writing of a first image field to catch up with the reading of a second image field (the second image field already being stored in the video buffer and the first image field being written into the video buffer). A similar fault condition exists where it may be possible for the reading of a first image field to catch up with the writing of a second image field. If this occurs, then the second image field's data may be lost. A fault condition may be based on a variety of factors such as the frame rates of the image sequences, video buffer write speed, video buffer read speed, and so forth. Visually, this may produce what is commonly referred to as image tearing, where data from two different image fields are displayed together as a single image field.

In a simplified image display system, where image source blanking times and other factors are not taken into account, a mathematical expression that may be used to detect a fault condition may be expressed as:

--- if an input sync signal is slower than an output sync signal, when output sync occurs,
    if(toggle(R_buffer_ptr) = W_buffer_ptr) and
        if(input_per - (W_ptr/lines_p_frame) * input_per) >
        output_per,
        then a fault condition will occur,

--- where input_per (input period) is the inverse of the frequency of the input sync signal (e.g., the second sync signal), output_per (output period) is the inverse of the output sync signal (e.g., the third sync signal), W_buffer_ptr (write buffer pointer) is the current video buffer being written into, R_buffer_ptr (read buffer pointer) is the current video buffer being read from, W_prt (write pointer) current image data line being written into video buffer, R_prt (read pointer) is the current image data line being read from video buffer, lines_p_frame (lines per frame) is a total number of image data lines per image field from an input image source, input_per (input period) is the period of an image data line of an image field of the input image sequence, output_per (output period) is the period of an image data line of an image field of an output image sequence, and toggle(.) toggles between video buffers.

Similarly, a mathematical expression to detect a fault condition if the output sync signal is slower than the input sync signal may be expressed as:

--- when input sync occurs,
    if(toggle(W_buffer_ptr) = R_buffer_ptr) and
        if(output_per - (R_ptr/line_p_frame) * output_per) >
        input_per,
        then a fault condition will occur.

---

In summary, a fault condition will occur if the write buffer pointer and the read buffer pointer are pointing to the same video buffer and if the faster operation (based on the speed of the sync signal) will complete the reading (or writing) of the image field from (or to) the video buffer before the slower operation. In other words, a fault condition will occur if a time difference between a second sync and a third sync is less than a difference between a duration required for a read operation from a video buffer to complete and a duration required for a write operation to a video buffer to complete.

In order to prevent image tearing, it may be necessary to detect the fault condition before the selection of a video buffer for storing an image field from the overlay control unit. For example, after the fourth video buffer is selected for storing the output image field "f(1o)" 274 (stored in the fourth video buffer as stored output image field "f(1o)" 276), a subsequent output image field from the overlay control unit (output image field "f(2e)" 268) may preferably be stored in the third video buffer. However, a rising edge 280 of a change in state of the second output buffer select signal (due to a rising edge of a pulse of the third sync signal) indicates that contents of the third video buffer has been selected as output of the second frame rate converter. Therefore, when a rising edge of a pulse of the second sync signal (shown as dashed line 282) arrives and causes a selection of a video buffer (either the third video buffer or the fourth video buffer) for storing of output image field "f(2e)" 268, the fourth video buffer is selected instead of the third video buffer (output image field "f(2e)" 268 is stored in the fourth video buffer as stored output image field "f(2e)" 284). By storing the output image field "f(2e)" 268 in the fourth video buffer instead of the third video buffer, a fault condition may be prevented.

By the time another rising edge of a pulse of the second sync signal (shown as dashed line 286) arrives, the fault condition has passed, so the third video buffer may be selected to store output repeated image field "f(2e)" 269 (shown as stored output repeated image field "f(2e)" 288). Similar fault conditions may occur with falling edge 290 of a change in state of the second output buffer select signal and a rising edge of a pulse of the second sync signal (shown as dashed line 291) and a rising edge 292 of a change in state of the second output buffer select signal and a rising edge of a pulse of the second sync signal (shown as dashed line 293).

In general, a set of rules may be used to determine the switching of the video buffers for the storing of the output of the overlay control unit (writing) and for the outputting of the stored image fields (reading). If the selection of the video buffers for the storing of the output of the overlay control unit is controlled by a slower sync signal, then for each pulse of the sync signal, the video buffer selected for writing toggles. However, if the selection of the video buffers for the storing of the output of the overlay control unit is controlled by a faster sync signal, then for each pulse of the sync signal where no fault condition (where the writing of an image field catches up with the reading of a stored image field) is detected, then the video buffer selected for writing toggles. For pulses of the sync signal where a fault condition is detected, then the video buffer selected for writing remains unchanged.

If the selection of the video buffer for outputting of the stored image fields is controlled by a slower sync signal, then for each pulse of the sync signal, the video buffer selected for reading toggles. However, if the selection of the video buffer for outputting of the stored image fields is controlled by a faster sync signal, then for each pulse of the sync signal where no fault condition (where the outputting of the stored image field catches up with the writing of another image field) is detected, the video buffer selected for reading toggles. For pulses of the sync signal where a fault condition is detected, then the video buffer selected for reading remains unchanged.

A combination of the alternating selection of the third video buffer and the fourth video buffer as output of the second frame rate converter and changes in the selection of the third video buffer and the fourth video buffer as storage for output of the overlay control unit may produce repeated images fields in the output of the second frame rate converter. For example, final output image field "f(2e)" 295 is repeated as final output repeated image field "f(2e)" 296 and final output image field "f(3o)" 297 is repeated as final output repeated image field "f(3o)" 298. In addition to image fields being repeated, image fields are dropped. For example, stored output image field "f(1o)" 276 and stored output image field "f(3e)" 299 do not appear in the output of the second frame rate converter.

Figure 3A:
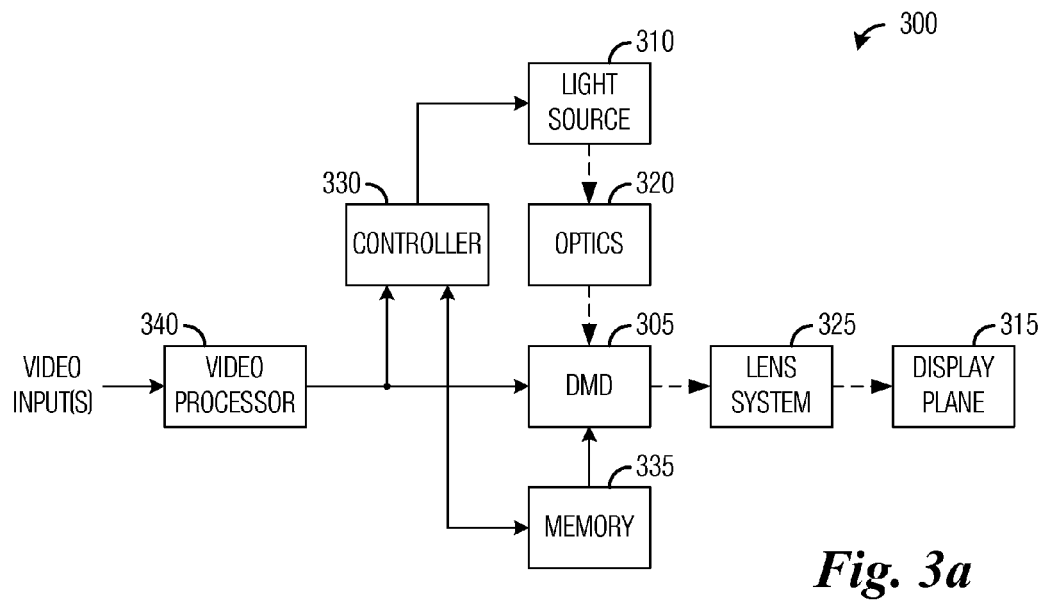
FIG. 3a is a block diagram illustrating a digital micromirror device-based display system.

FIG. 3a is a diagram illustrating a DMD-based image display system 300. The image display system 300 includes a DMD 305 that modulates light produced by a light source 310. The DMD 305 is an example of a microdisplay or an array of light modulators. Other examples of microdisplays may include transmissive or reflective liquid crystal, liquid crystal on silicon, ferroelectric liquid-crystal-on-silicon, deformable micromirrors, and so forth. In a microdisplay, a number of light modulators may be arranged in a rectangular, square, diamond shaped, and so forth, array.

Each light modulator in the microdisplay may operate in conjunction with the other light modulators in the microdisplay to modulate the light produced by the light source 310. For example, in the DMD 305, each light modulator is a pivoting mirror that generally pivots between one of two positions depending on image data being displayed. In a first position, the light modulator reflects light from the light source onto a display plane 315 and in a second position, the light modulator reflects light away from the display plane 315. The light modulated by the DMD 205 may be used to create images on the display plane 315. The image projection display system 300 also includes an optics system 320, which may be used to collimate the light produced by the light source 210 as well as to collect stray light, and a lens system 325, which may be used to manipulate (for example, focus) the light reflecting off the DMD 305.

If the image display system 300 is a different type of image display system, then there may be differences between specific systems. For example, if the image display system 300 uses a different form of microdisplay, then the DMD 305 may be replaced with a different microdisplay. Alternatively, if the image display system 300 is a direct view system instead of a projection system, then the image display system 300 may include a different lens system 325. Furthermore, if the image display system 300 is a cathode ray tube-based direct view system, then the image display system 300 may not include the light source 310, the optics system 320, the lens system 325, or the display plane 315. If the image display system 300 is a cathode ray tube-based projection system, then the image display system 300 may include the lens system 325 and the display plane 315, but not the light source 310 or the optics system 320.

The DMD 305 may be coupled to a controller 330, which may be responsible for loading image data into the DMD 305, controlling the operation of the DMD 305, providing micromirror control commands to the DMD 305, controlling the light produced by the light source 310, and so forth. A memory 335, which may be coupled to the DMD 305 and the controller 330, may be used to store the image data, as well as configuration data, color correction data, and so forth.

The image display system 300 also includes a video processor 340. The video processor 340 may be used to perform processing on an image sequence(s) provided by the video input(s). For example, the video processor 340 may be used to perform up-conversion on interlaced image fields, image color correction, image color adjusting, gamma correction, filtering, dithering, changing bit depths, creating image overlays, changing image resolution, changing image sequence frame rates, and so forth.

Figure 3B:
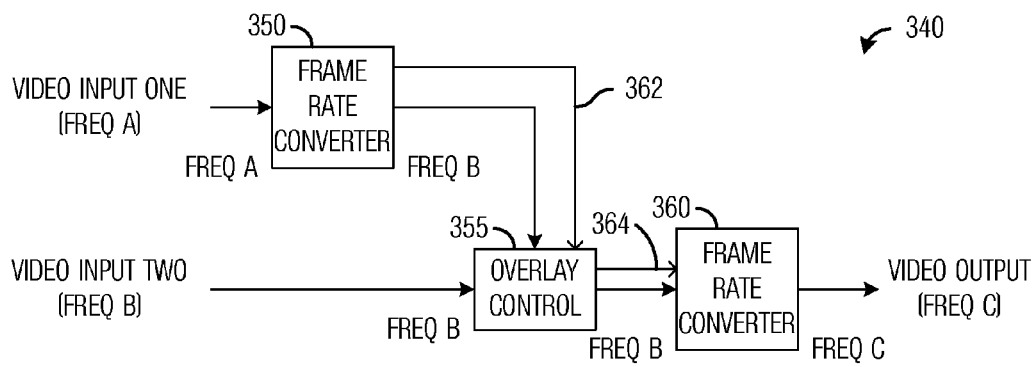
FIG. 3b is a block diagram illustrating a detailed view of a portion of a video processor.

FIG. 3b illustrates a detailed view of a portion of the video processor 340, for creating image overlays, the video processor 340 includes a first frame rate converter 350 coupled to a first video input which provides a first image sequence at a first frame rate. The video processor 340 also includes a second video input which provides a second image sequence at a second frame rate. If the first frame rate and the second frame rate are not substantially equal, then the first frame rate converter 350 may be used to convert the first image sequence from the first frame rate to the second frame rate. The video processor 340 also includes an overlay control unit 355. The overlay control unit 355 may be used to create an overlay image sequence by overlaying the first image sequence, now at the second frame rate, over the second image sequence.

In order to display the overlay image sequence on the image display system 300, the frame rate of the overlay image sequence (the second frame rate) must substantially match the frame rate of the image display system 300 (a third frame rate). If the second frame rate and the third frame rate are not about equal, then the video processor 340 may perform an additional frame rate conversion using a second frame rate converter 360. The second frame rate converter 360 may be used to convert the overlay image sequence at the second frame rate to the third frame rate, which may then be displayed on the image display system 300.

As discussed previously, frame rate conversion of an image sequence may create repeated image fields, which, during a subsequent frame rate conversion to match a frame rate of a display system, may produce image judder if some image fields need to be dropped. The image judder may be exacerbated if some of the image fields dropped are not the repeated image fields but non-repeated image fields.

A control signal line 362 coupled between the first frame rate converter 350 and the overlay control unit 355 and a control signal line 364 coupled between the overlay control unit 355 and the second frame rate converter 360 may be used to indicate when image fields are repeated by the first frame rate converter 350. Then, if the second frame rate converter 360 needs to drop an image field, a control signal carried on the control signal lines 362 and 364 may be used to determine which image fields to drop. That is, the second frame rate converter 360 may drop a repeated image instead of a non-repeated image.

Figure 3C:
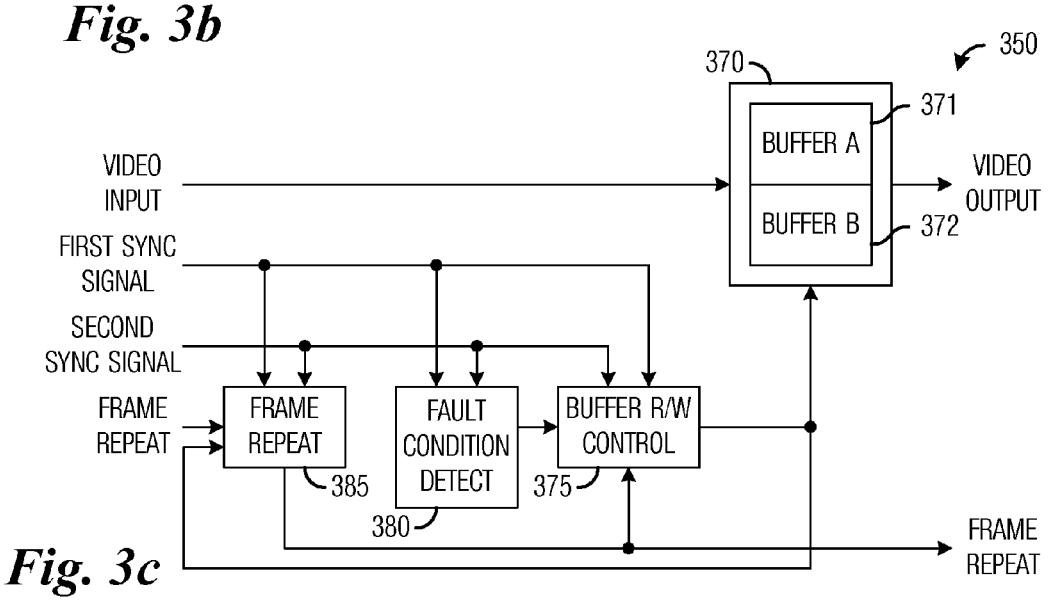
FIG. 3c is a block diagram illustrating a detailed view of a frame rate converter.

FIG. 3c illustrates a detailed view of a frame rate converter, such as the first frame rate converter 350. The first frame rate converter 350 includes a buffer bank 370 comprising a buffer 'A' 371 and a buffer 'B' 372. A video input may be coupled to an input of the buffer bank 370 and an output of the buffer bank 370 may be coupled to a video output. The buffer A 371 and the buffer B 372 may be sized according to an expected size of image fields that may be stored in the buffers.

Image fields provided by the video input may be stored in either the buffer A 371 or the buffer B 372 based on a control signal provided by a buffer read/write (R/W) control unit 375. The buffer R/W control unit 375 may generate the control signal based on which buffer is currently selected for reading and/or writing. In general, as a new image field is received for writing, the buffer R/W control unit 375 may toggle the buffer that will be used to store the new image field. Similarly, when selecting the buffer that may provide an output image field, the buffer R/W control unit 375 may toggle the buffer to be used.

The buffer R/W control unit 375 may also make use of a fault condition control signal provided by a fault condition detect unit 380. The fault condition detect unit 380 may detect fault conditions such as a reading of a selected buffer catching up to a writing of the selected buffer or a writing of a selected buffer catching up to a reading of the selected buffer. The fault condition detect unit 380 may assert the fault condition control signal based on a relationship of two sync signals: a first sync signal used to synchronize an image sequence being frame rate converted by the first frame rate converter 350, and a second sync signal used to synchronize an output image sequence created by the first frame rate converter 350.

The buffer R/W control unit 375 may also make use of a frame repeat signal. The frame repeat signal may be provided by an external source, such as another frame rate converter, or the frame repeat signal may be generated by a frame repeat unit 385. The frame repeat unit 385 may assert a specified value when it detects that due to a relationship between the first sync signal and the second sync signal and/or the control signal asserted by the buffer R/W control unit 375, the first frame rate converter 350 is going to produce an output image field that is a repeat of a previously outputted image field.

Figure 4:
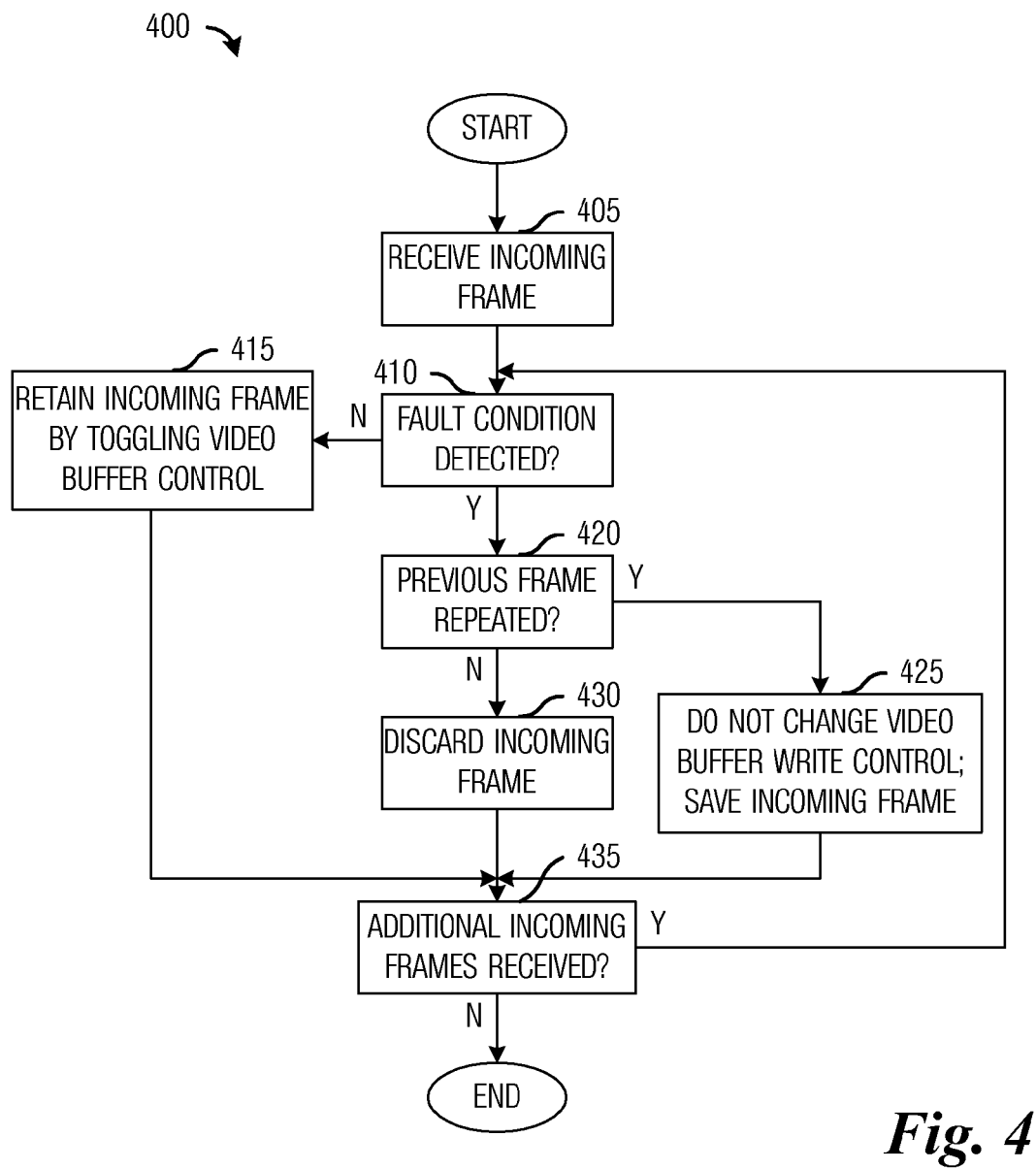
FIG. 4 is a flow diagram of a sequence of events in the frame rate conversion of a previously frame rate converted image sequence.

FIG. 4 is a flow diagram illustrating a sequence of events 400 in the frame rate conversion of a previously frame rate adjusted image sequence, the sequence of events 400 including a technique for reducing image judder. The sequence of events 400 may be descriptive of events taking place during a second (or later) frame rate conversion of an image sequence that has previously undergone frame rate conversion. The frame rate conversion with reduced image judder may be in operation while image fields are received and may continue until image fields stop.

The frame rate conversion with reduced image judder may begin when an incoming image field from an image sequence of interlaced image frames is received (block 405). The incoming image field may be part of an image sequence that has already undergone frame rate conversion. As the incoming image field is being received, a check to detect the presence of a fault condition may be performed (block 410). As discussed previously, a fault condition may be detected by examining a first sync signal used to synchronize the incoming image field and its associated input image sequence and a second sync signal used to synchronize output image fields and its associated output image sequence. A fault condition may arise if sync pulses of the first sync signal and the second sync signal occur too closely to one another. If this is the case, then it may be possible for a writing of a first image field to catch up to a reading of a second image field or a reading of a first image field to catch up to a writing of a second image field.

If no fault condition is detected (block 410), then a video buffer write control toggles a selection of a video buffer (block 415). For example, if there are video buffer A and video buffer B, and video buffer B was previously selected as the video buffer for writing, then the video buffer write control may be toggled to select video buffer A, and vice versa. The toggling of the video buffer write control may utilize the first sync signal for timing purposes.

If a fault condition is detected (block 415), then an additional check may be performed to detect if a frame repeat control signal was asserted true for the incoming frame (block 420). The frame repeated control signal may be provided by a frame rate converter from an earlier frame rate conversion, or the frame repeat control signal may be computed by a frame repeat unit, such as the frame repeat unit 385 (FIG. 3c). If the frame repeat control signal was asserted true for a previous image field (block 420), then the video buffer write control may be left unchanged and the incoming image field may be saved (block 425). If the frame repeat control signal is not asserted (block 420), indicating that the incoming image field is not a repeated image field, then the incoming image field may be discarded (block 430).

After the incoming image field is complete and the selected operation on the incoming image field finishes, a check may be performed to determine if an additional incoming image field is being received (block 435). If an additional incoming image field is being received, then the frame rate conversion with reduced image judder may repeat, starting with a check to determine fault conditions (block 410). If an additional incoming image is not being received, then the frame rate conversion with reduced image judder may terminate.

Although the discussion of the sequence of events 400 references an image sequence comprised of non-interlaced image frames, the sequence of events 400 may also be operable with an image sequence comprised of interlaced image frames. Therefore, the discussion of image frames rather than image fields (odd and/or even) should not be construed as being limiting either to the scope or the spirit of the embodiments.

Figure 5A:
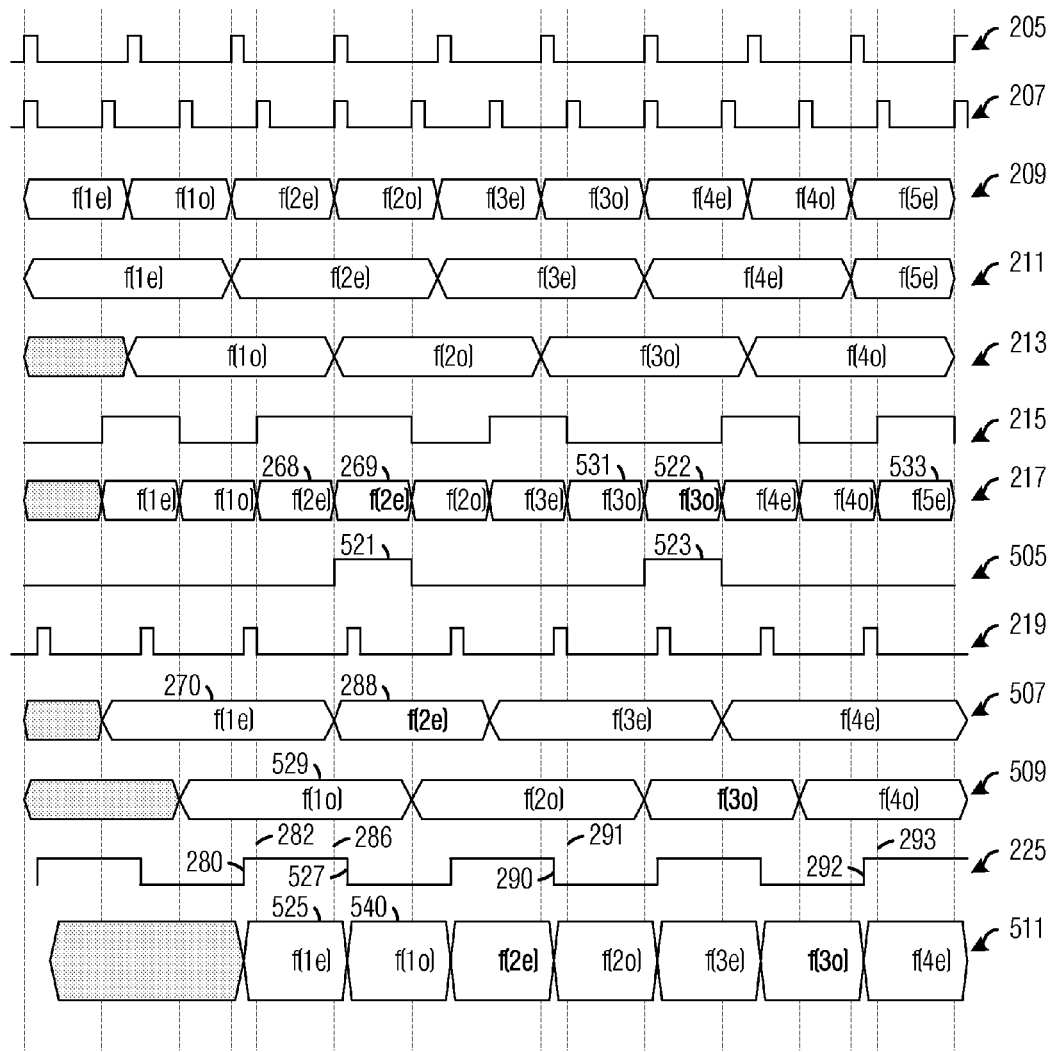
FIG. 5a is a timing diagram illustrating multiple waveforms in an image display system with interlaced image sequences, wherein the image display system uses a technique for reducing image judder that considers frame repeats.

FIG. 5a is a timing diagram illustrating multiple waveforms in an image display system, wherein the image display system uses a technique for reducing image judder. As shown in FIG. 5a, waveforms 205 through 217, 219, and 225 are identical to similarly numbered waveforms shown in FIG. 2, while waveform 505 represents a frame repeat control signal, waveform 507 represents contents of a third video buffer, waveform 509 represents contents of a fourth video buffer, and waveform 511 represents an output of a second frame rate converter, such as the second frame rate converter 360.

The waveform 505 displays a state of the frame repeat control signal, which, as shown in FIG. 5a, may transition to a high value when an output image field of a first frame rate converter, such as the first frame rate converter 350, is repeated. As shown in FIG. 5a, the frame repeat control signal transitions to a high value when output image fields "f(2e)" 269 (shown as level 521) and "f(3o)" 522 (shown as level 523) are outputted by the first frame rate converter 350.

As discussed previously in conjunction with FIG. 2, a fault condition may arise at times indicated by rising edge 280 and time event 282 corresponding to a rising edge of a pulse on a sync signal used to time the output of the first frame rate converter 350. Additional fault conditions may arise at time indicated by falling edge 290 and time event 291 as well as rising edge 292 and time event 293.

At rising edge 280, a buffer R/W control unit in the second frame rate converter 360 may toggle a control signal used to select from either the third video buffer or the fourth video buffer for output (reading) purposes. As shown in FIG. 5a, the third video buffer is selected and the contents of the third video buffer, stored output image field "f(1e)" 270, is outputted by the second frame rate converter 360 (shown as final output image field "f(1e)" 525).

A small amount of time after the rising edge 280, time event 282 occurs and the buffer R/W control unit in the second frame rate converter 360 may decide between using the third video buffer or the fourth video buffer to store a new output image field (output image field "f(2e)" 268 from the first frame rate converter 350. Since a fault condition was detected and the frame repeat signal (waveform 505) has a low value, then the buffer R/W control unit may discard the output image field "f(2e)" 268 as described in block 430 of FIG. 4, and leave the contents of the third video buffer and the fourth video buffer as well as the control signal used to select a video buffer for storing (writing) purposes unchanged. Similarly, at a fault condition occurring at falling edge 290 and time event 291, output image frame "f(3o)" 531 is discarded and at a fault condition occurring at rising edge 292 and time event 293, output image frame "f(5e)" 533 is discarded.

At time event 286, since no fault condition was detected, the buffer R/W control unit of the second frame rate converter 360 may toggle the control signal used to select a video buffer for storing an incoming image field (output repeated image field "f(2e)" 269) from the first frame rate converter 350 in the third video buffer (shown as stored output repeated image field "f(2e)" 288 of waveform 507).

At falling edge 527, the buffer R/W control unit of the second frame rate converter 360 toggles a control signal used to select a video buffer for reading a stored image field from either the third video buffer or the fourth video buffer. The buffer R/W control unit previously selected to output an image field stored in the third video buffer, so the buffer R/W control unit will not select to output an image field stored in the fourth video buffer, resulting in an outputting of stored output image field "f(1o)" 529 (shown in waveform 511 as final output image field "f(1o)" 540).

Examination of the output of the second frame rate converter (waveform 511), shows that the output includes a good mix of even and odd image fields, such as final output image field "f(1e)" 525, final output image field "f(1o)" 540, and so forth, and that the image fields may be in sequential order without any image fields missing.

Figure 5B:
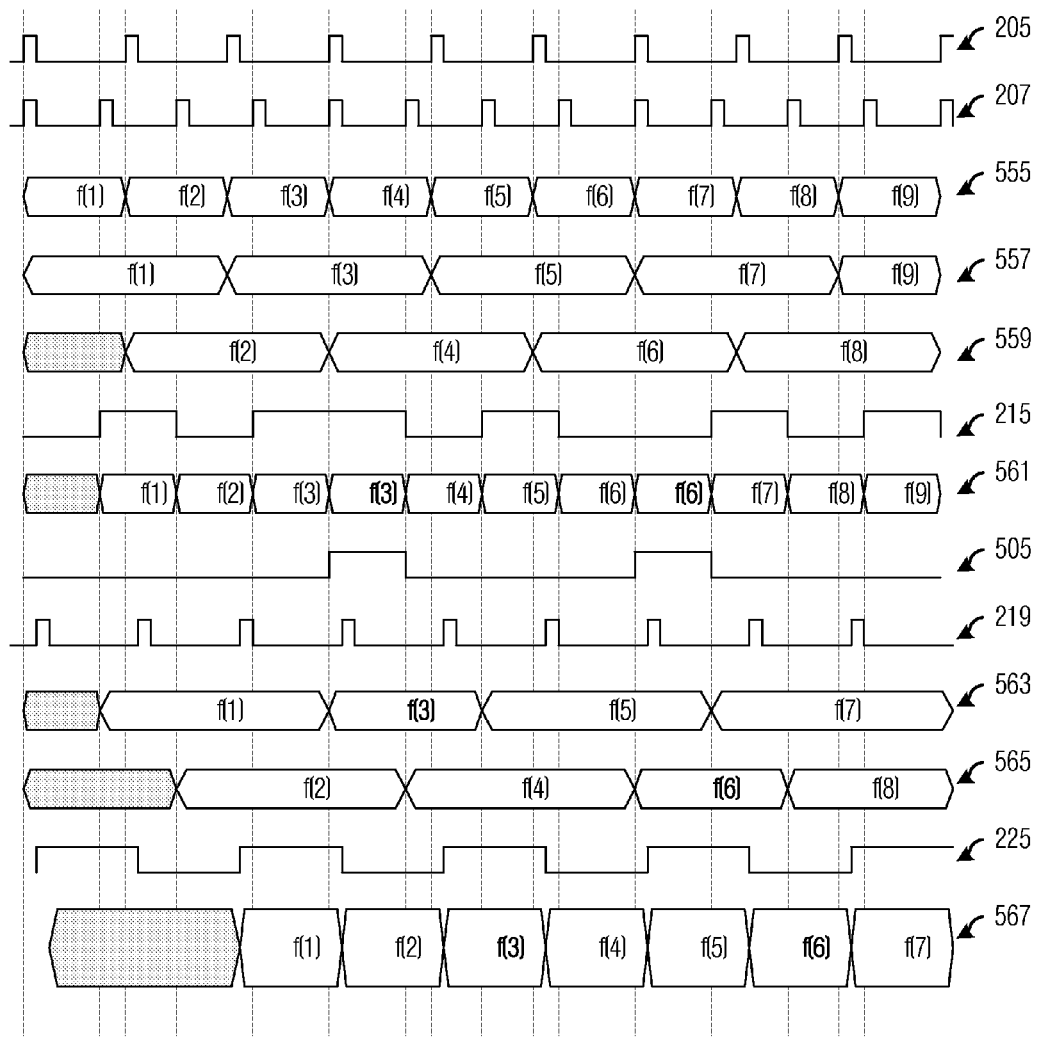
FIG. 5b is a timing diagram illustrating multiple waveforms in an image display system with non-interlaced image sequences, wherein the image display system uses a technique for reducing image judder that considers frame repeats.

FIG. 5b is a diagram illustrating multiple waveforms in an image display system, wherein the image display system uses a technique for reducing image judder. In FIG. 5b, an image sequence comprises non-interlaced images rather than interlaced images. Therefore, rather than having an odd image field and an even image field for each interlaced image, each non-interlaced is a single non-interlaced image frame. As shown in FIG. 5b, waveforms 205, 207, 215, 219, 225, and 505 are identical to similarly numbered waveforms shown in FIG. 5a, while waveform 555 represents an incoming image sequence comprising non-interlaced image frames, waveform 557 represents contents of the first video buffer, waveform 559 represent contents of the second video buffer, waveform 561 represents an output of a first frame rate converter, such as the first frame rate converter 350, waveform 563 represents contents of the third video buffer, waveform 565 represents contents of the fourth video buffer, and waveform 567 represents an output of a second frame rate converter, such as the second frame rate converter 360.

As shown in waveform 567, the output of the second frame rate converter 360 may retain all of the non-interlaced image frames present in the original image sequence shown in waveform 555. No non-interlaced image frames were repeated or dropped, as with the case of the original image sequence being a sequence of interlaced images.

Figure 6A:
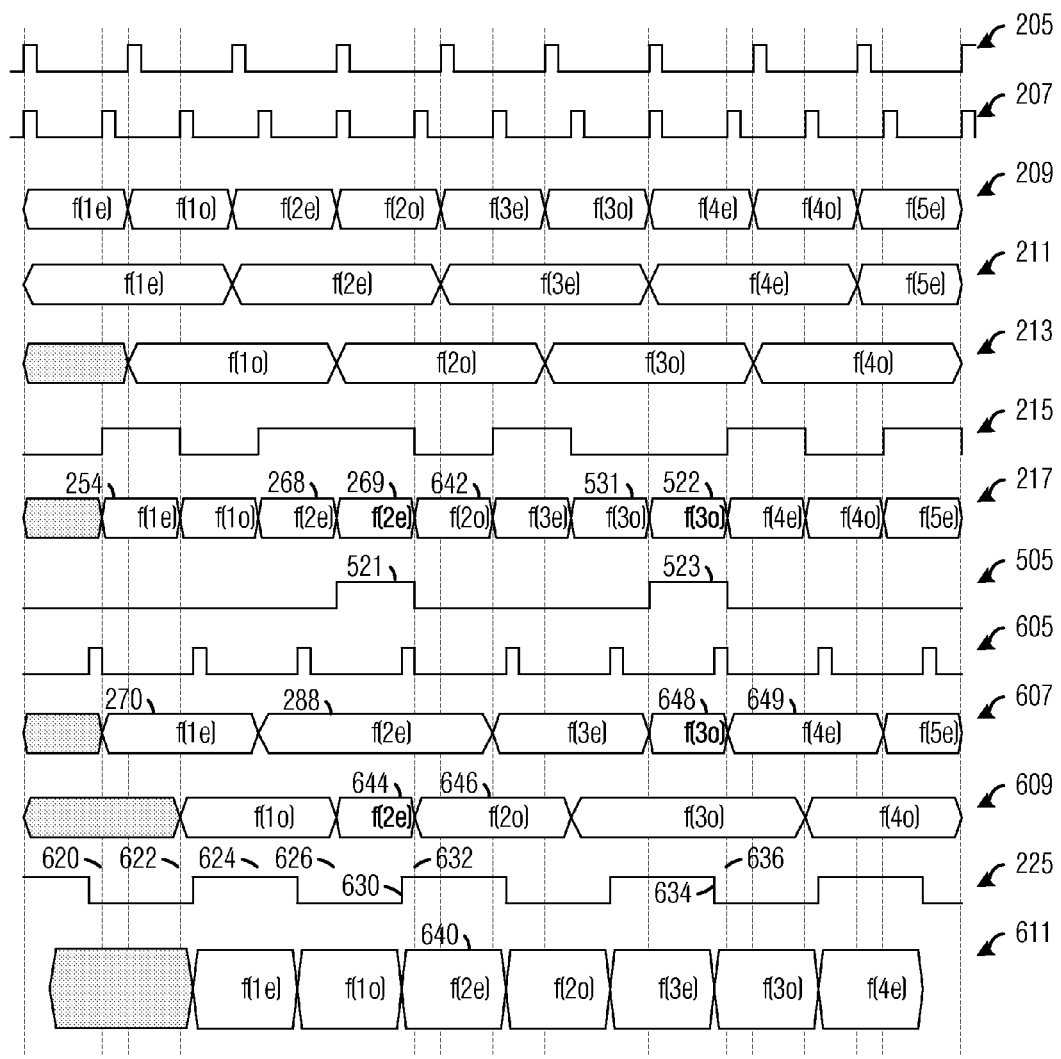
FIG. 6a is a timing diagram illustrating multiple waveforms in an image display system with interlaced image sequences, wherein the image display system uses a technique for reducing image judder that considers frame repeats.

FIG. 6a is a timing diagram illustrating multiple waveforms in an image display system, wherein the image display system uses a technique for reducing image judder. As shown in FIG. 6a, waveforms 205 through 217, 225, and 505 are identical to similarly numbered waveforms shown in FIG. 5a, while waveform 605 represents a delayed sync signal used to time an output of a frame rate converter, such as the second frame rate converter 360, waveform 607 represents contents of a third video buffer, waveform 609 represents contents of a fourth video buffer, and waveform 611 represents an output of the second frame rate converter 360.

The delayed sync signal shown as waveform 605 may have substantially the same frequency as the sync signal shown as waveform 219. However, the delayed sync signal may be delayed a fraction of a period when compared to the sync signal of waveform 219. As a result, fault conditions may have changed. Fault conditions now may be found at rising edge 620 and time event 622 and falling edge 624 and time event 626.

For discussion purposes, at time event 620, let a buffer R/W control unit of the second frame rate converter 360 select the third video buffer for storing (writing) purposes. This may result in output image field "f(1e)" 254 being stored in the third video buffer as stored output image field "f(1e)" 270. Then at time events 622, 624, and 626, the buffer R/W control unit of the second frame rate converter 360 may toggle between the fourth video buffer and the third video buffer to store incoming image fields. For example, at time event 626, the fourth video buffer is selected.

At rising edge 630, the buffer R/W control unit in the second frame rate converter 360 may toggle a control signal used to select from either the third video buffer or the fourth video buffer for output (reading) purposes. As shown in FIG. 6a, the third video buffer is selected and the contents of the third video buffer, stored output image field "f(2e)" 288, is outputted by the second frame rate converter 360 (shown as final output image field "f(2e)" 640).

Then, at time event 632, which occurs a small period of time after the rising edge 630, the buffer R/W control unit of the second frame rate converter 360 would have ordinarily selected the third video buffer to store an incoming image field (output image field "f(2o)" 642). However, since the third video buffer was just selected for outputting (reading) purposes at the rising edge 630, a fault condition may occur. Since a fault condition is detected, a check may be performed to determine if an image field prior to the incoming image field (output image field "f(2o)" 642) was repeated, i.e., was a frame repeat control signal asserted true during an image field immediately prior to the output image field "f(2o)" 642 (block 420 of FIG. 4).

In this case, output repeated image field "f(2e)" 269, the image field immediately prior to the output image field "f(2o)" 642, was indeed repeated. Therefore, the buffer R/W control unit of the second frame rate converter 360 would leave a control signal used to select a video buffer for storing (writing) purposes unchanged and store the incoming frame in the selected video buffer (currently the fourth video buffer), overwriting an image field stored in the fourth video buffer (a stored output repeated image field "f(2e)" 644) with a stored output image field "f(2o)" 646. Similarly, at a fault condition occurring at falling edge 634 and time event 636, an image field stored in the third video buffer (a stored output repeated image field "f(3o)" 648) is overwritten with a stored output image field "f(4e)" 649.

Figure 6B:
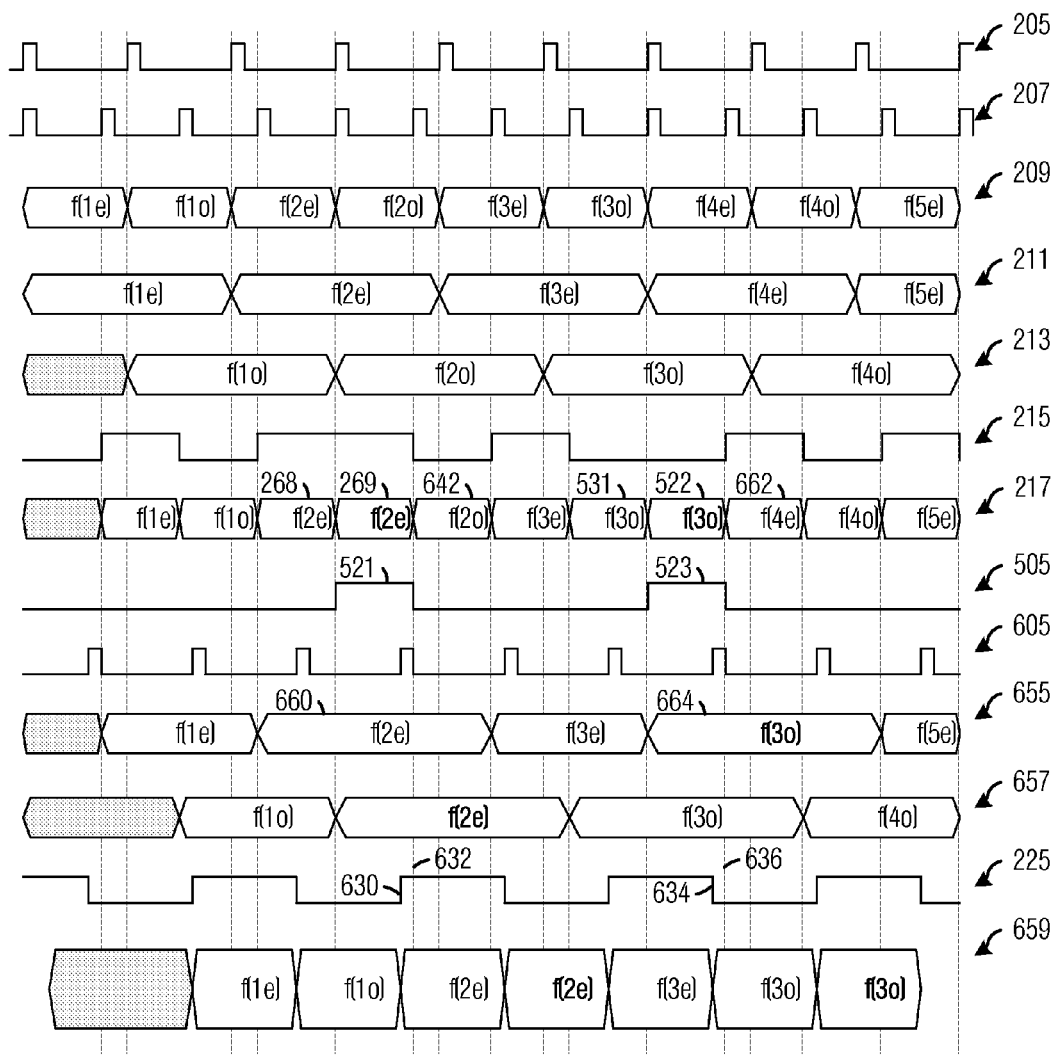
FIG. 6b is a timing diagram illustrating multiple waveforms in an image display system with interlaced image sequences, wherein the image display system uses a technique for reducing image judder.

FIG. 6b is a timing diagram illustrating multiple waveforms in an image display system, wherein the image display system uses a technique for reducing image judder. The technique used for reducing image judder comprises dropping an incoming image field if a fault condition is detected. As shown in FIG. 6b, waveforms 205 through 217, 225, 505, and 605 are identical to similarly numbered waveforms shown in FIG. 6a, while waveform 655 represents contents of a third video buffer, waveform 657 represents contents of a fourth video buffer, and waveform 611 represents an output of the second frame rate converter 360.

At a fault condition occurring at rising edge 630 and time event 632, a buffer R/W control unit in the second frame rate converter 360 may decide to drop an incoming image field (output image field "f(2o)" 642) and leave a stored image field (stored output image field "f(2e)" 660) unchanged. Similarly, at a fault condition occurring at falling edge 634 and time event 636, an incoming field (output image field "f(4e)" 662) may be dropped and a stored image field (stored output image field "f(3o)" 664) may be left unchanged.

Comparing an output image field sequence from FIG. 6a (waveform 611) and an output image field sequence from FIG. 6b (waveform 659), the output image field sequence from FIG. 6a has a good distribution of even and odd image fields and the image fields may be in sequential order without any image fields missing, while the output image field sequence from FIG. 6b includes a series of only even image fields and odd image fields with some missing image fields.

Figure 7:
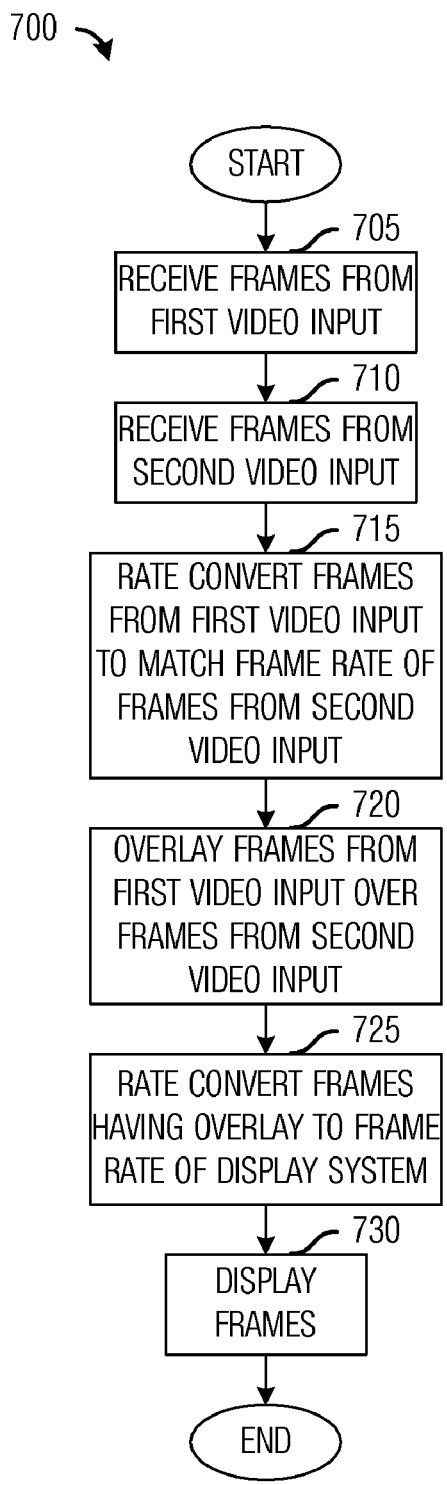
FIG. 7 is a flow diagram illustrating a sequence of events in the generating and displaying of overlay images.

FIG. 7 is a flow diagram illustrating a sequence of events 700 in the creating and displaying of images having overlays. The creating and displaying of images having overlays may involve the combining of at least two image sequences, each with a different frame rate. The creating and displaying of images having overlays may begin as image fields from the two image sequences are received and may continue until one or both image sequences stop or when a display system used to display the images with overlays is turned off, reset, used to display other types of images, or so on.

The creating and displaying of images having overlays may begin as image fields from a first image sequence at a first frame rate and a second image sequence at a second frame rate are received (blocks 705 and 710). For discussion purposes, let the images having overlays be created by overlaying image fields from the first image sequence over image fields from the second image sequence. Since the image fields from the first image sequence will be overlaid over image fields from the second image sequence, the first image sequence may be frame rate converted from the first frame rate to the second frame rate (block 715). The frame rate conversion of the first image sequence may involve adding (repeating) or removing (dropping) image fields from the first image sequence.

With the frame rate of the first image sequence substantially matching the frame rate of the second image sequence, image fields from the first image sequence may be overlaid over image fields from the second image sequence (block 720). As the image fields having overlays are created, they may be displayed. However, if the second frame rate is not about equal to a frame rate of the display system, a second frame rate conversion may need to be performed to match the frame rate of the image fields having overlays to the frame rate of the display system (block 725). The second frame rate conversion may include the use of the frame rate conversion of a previously frame rate adjusted image sequence (the sequence of events 400 shown in FIG. 4) to help reduce or eliminate image judder. Once the frame rate of the image sequence having overlays has been matched to the frame rate of the display system, the image fields may be displayed (block 730).

Figure 8A:
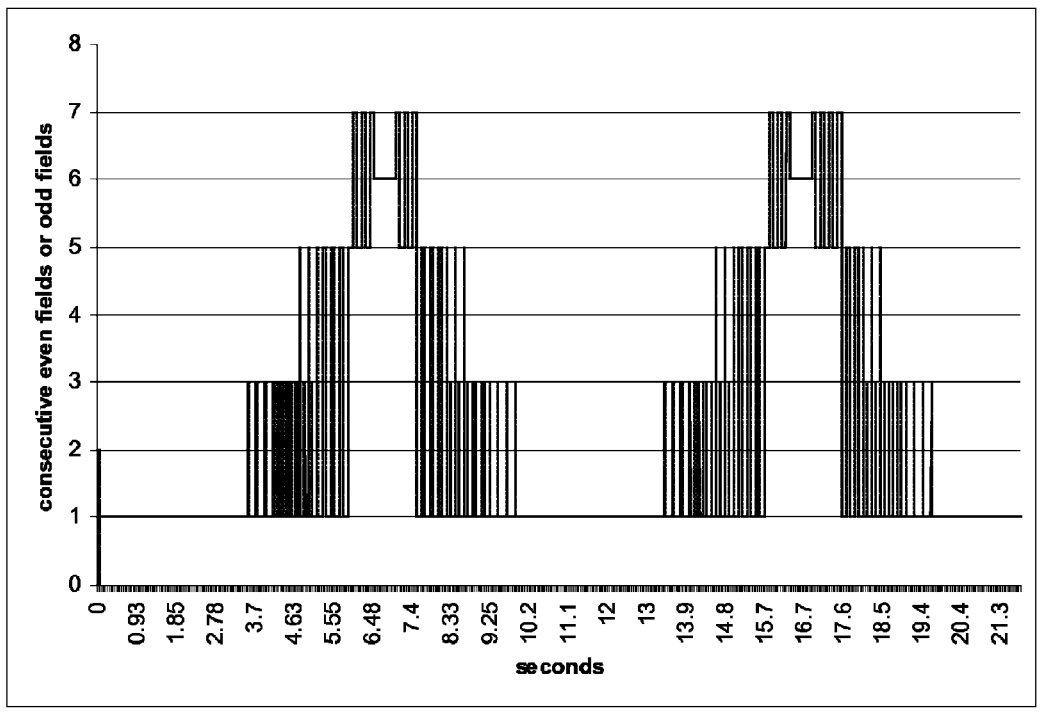
FIG. 8a is a data plot of a count of series of consecutive odd or even image fields in an overlay image sequence created using a prior art technique for reducing image judder.
Figure 8B:
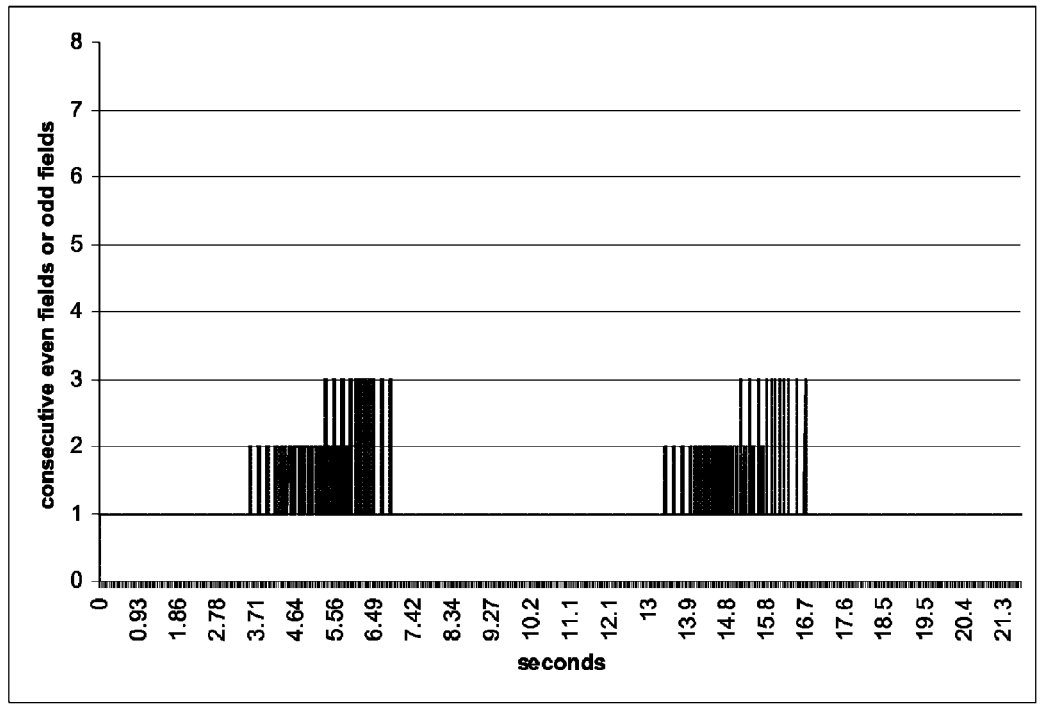
FIG. 8b is a data plot of a count of series of consecutive odd or even image fields in an overlay image sequence created using a technique for reducing image judder that considers frame repeats.

FIG. 8a is a data plot illustrating a count of series of consecutive odd or even image fields in an overlay image sequence created using a prior art technique for reducing image judder and FIG. 8b is a data plot illustrating a count of series of consecutive odd or even image fields in an overlay image sequence created using a technique for reducing image judder that considers frame repeats. Comparing FIG. 8a and FIG. 8b, FIG. 8a shows that there are multiple instances wherein five, six, or seven consecutive odd (or even) image fields are displayed. This means that corresponding even (or odd) image fields are being dropped. This may result in a considerable amount of image judder. FIG. 8b shows that at worse, there are instances wherein two or three consecutive odd (or even) image fields are displayed, meaning that corresponding even (or odd) image fields are dropped. Since significantly fewer image fields are dropped, there may be less image judder.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods, or steps.

What is claimed is:

1. A method for performing a frame rate conversion from a first frame rate to a second frame rate, the method comprising:
    receiving an incoming frame at the first frame rate;
    determining whether a fault condition exists;
    if the fault condition does not exist,
        toggling a write buffer pointer between a first frame buffer and a second frame buffer, and
        storing the incoming frame in the frame buffer pointed to by the write buffer pointer; and
    if the fault condition exists,
        determining whether a previously received frame was repeated,
        discarding the incoming frame if the previously received incoming frame was not repeated, and
        storing the incoming frame in the frame buffer pointed to by the write buffer pointer if the previously received incoming frame was repeated.

2. The method of claim 1, further comprising outputting a frame stored in one of the frame buffers pointed to by a read buffer pointer, wherein the outputting is timed by a synch signal at the second frame rate.

3. The method of claim 2, wherein the outputting comprises, at a specified point of the sync signal, toggling the read buffer pointer.

4. The method of claim 3, wherein the specified point is selected from the group consisting of: a rising edge, a falling edge, a threshold, a level value, and combinations thereof.

5. The method of claim 1, wherein the determining whether a fault condition exists comprises:
    determining that a first specified point of a first sync signal at the first frame rate and a second specified point of a second sync signal at the second frame rate are occurring within a specified time period of each other; and
    after the occurrence of an earlier of the first specified point or the second specified point, determining that the write buffer pointer is selecting one of the frame buffers different from one of the frame buffers pointed to by a read buffer pointer.

6. The method of claim 5, wherein the specified time period is a difference between a first duration for a read operation from one of the frame buffers to complete and a second duration for a write operation to one of the frame buffers to complete.

7. The method of claim 1, further comprising leaving the write buffer pointer unchanged if the fault condition exists and if the previously received incoming frame was not repeated.

8. The method of claim 1, further comprising leaving the write buffer pointer unchanged if the fault condition exists and if the previously received incoming frame was repeated.

9. A method for displaying overlay images from a first image sequence having a first frame rate and a second image sequence having a second frame rate on a display system having a display frame rate, the method comprising:
    generating an overlay image sequence from the first image sequence and the second image sequence;
    frame rate converting the overlay image sequence to the display frame rate, wherein the frame rate converting comprises determining whether an overlay image frame will be stored based on a frame repeat control signal indicating when there is a repeated frame in the overlay image sequence; and
    displaying the frame rate converted overlay image sequence at the display frame rate.

10. The method of claim 9, wherein the generating comprises:
    frame rate converting the first image sequence to the second frame rate;
    receiving a first image frame from the frame rate converted first image sequence;
    receiving a second image frame from the second image sequence;
    creating an overlay image frame with the first image and the second image; and
    repeating the receiving a first image frame, the receiving a second image frame, and the creating for other image frames from the frame rate converted first image sequence and the second image sequence to produce the overlay image sequence.

11. The method of claim 10, wherein the frame rate converting the first image sequence comprises asserting the frame repeat control signal for the repeated frame, and wherein the frame rate converting the overlay image sequence comprises:
    receiving the overlay image frame;
    determining whether a fault condition exists;
    if the fault condition does not exist,
        toggling a write buffer pointer between a first frame buffer and a second frame buffer, and
        storing the overlay image frame in the frame buffer pointed to by the write buffer pointer; and
    if the fault condition exists,
        determining whether a previously received overlay image frame was repeated,
        discarding the overlay image frame if the previously received overlay image frame was not repeated, and
        storing the overlay image frame in the frame buffer pointed to by the write buffer pointer if the previously received overlay image frame was repeated.

12. The method of claim 11, wherein the determining that the previously received overlay image frame was repeated comprises sensing a specified value on the frame repeat control signal.

13. The method of claim 12, wherein the determining a fault condition exists comprises:
    determining that a first specified point of a first sync signal at the first frame rate and a second specified point of a second sync signal at the second frame rate are occurring within a specified time period of each other; and
    determining that, after the occurrence of both specified points, the write buffer pointer and a read buffer pointer are pointing to one frame buffer.

14. The method of claim 13, wherein the specified period of time is a difference between a first duration for a read operation from one of the frame buffers to complete and a second duration for a write operation to one of the frame buffers to complete.

15. The method of claim 11, wherein the previously received overlay image frame is received immediately prior to the overlay image frame.

16. The method of claim 10, wherein the first frame rate is lower than the second frame rate, and the second frame rate is higher than the display frame rate.

17. The method of claim 9, wherein the second frame rate and the display frame rate are different.

18. A display system comprising:
- a display configured to produce images based on image data;
- a first image input receiving a first image sequence at a first frame rate;
- a second image input receiving a second image sequence at a second frame rate;
- a video processor coupled to the first image input and to the second image input, the video processor configured to perform a sequence of frame rate conversions on the first image sequence and the second image sequence, wherein each frame rate conversion after an initial frame rate conversion uses a frame repeat control signal generated during a previous frame rate conversion to determine if an image frame will be stored; and
- a controller coupled to the video processor and to the display, the controller configured to control the operation of the display based on the image data.

19. The display system of claim 18, wherein the video processor comprises:
- a first frame rate converter coupled to the first image input, the first frame rate converter configured to convert the first image sequence to the second frame rate and to assert a value on the frame repeat control signal if an image is repeated;
- an overlay control unit coupled to the first frame rate converter and to the second image input, the overlay control unit configured to create an overlay image sequence by overlaying images from the frame rate converted first image sequence over images from the second image sequence; and
- a second frame rate converter coupled to the overlay control unit, the second frame rate converter configured to convert the overlay image sequence from the second frame rate to a display frame rate of the display system.

20. The display system of claim 19, wherein the first frame rate converter and the second frame rate converter each comprises:
- a first buffer to store a first image;
- a second buffer to store a second image;
- a buffer read/write control unit coupled to a first sync signal line, to a second sync signal line, to the first buffer, and to the second buffer, the buffer read/write control unit configured to control a selection of one of the buffers for reading and one of the buffers for writing based on a first sync signal and a second sync signal;
- a fault condition detect unit coupled the buffer read/write control unit, to the first sync signal line, and to the second sync signal line, the fault condition detect unit configured to detect a presence of a fault condition based on the first sync signal and the second sync signal; and
- a frame repeat unit coupled to the buffer read/write control unit, to the first sync signal line, and to the second sync signal line, the frame repeat unit configured to assert a value on a frame repeat signal line when a repeated image is generated.

* * * * *